(12) United States Patent
Agranat et al.

(10) Patent No.: US 10,612,967 B2
(45) Date of Patent: Apr. 7, 2020

(54) ULTRASONIC MICROPHONE ENCLOSURE

(71) Applicant: WILDLIFE ACOUSTICS, INC., Maynard, MA (US)

(72) Inventors: Ian Agranat, Concord, MA (US); Andrew P. Moroney, Northborough, MA (US)

(73) Assignee: WILDLIFE ACOUSTICS, INC., Maynard, MA (US)

( * ) Notice: Subject to any disclaimer, the term of this patent is extended or adjusted under 35 U.S.C. 154(b) by 294 days.

(21) Appl. No.: 15/433,831

(22) Filed: Feb. 15, 2017

(65) Prior Publication Data

US 2018/0233827 A1   Aug. 16, 2018

(51) Int. Cl.
| H04R 1/08 | (2006.01) |
| H04R 3/04 | (2006.01) |
| H04R 1/02 | (2006.01) |
| G01H 3/00 | (2006.01) |
| G10K 11/04 | (2006.01) |

(52) U.S. Cl.
CPC ............... *G01H 3/00* (2013.01); *G10K 11/04* (2013.01)

(58) Field of Classification Search
CPC .................................. G01H 3/00; G10K 11/04
See application file for complete search history.

(56) References Cited

U.S. PATENT DOCUMENTS

| 4,088,835 | A  | 5/1978  | Thurmond et al. |
| 7,454,334 | B2 | 11/2008 | Agranat |
| 7,782,195 | B2 | 8/2010  | Agranat |
| 8,477,981 | B2 | 7/2013  | Heck et al. |
| 8,599,647 | B2 | 12/2013 | Agranat |
| 8,627,723 | B2 | 1/2014  | Agranat |
| 8,995,230 | B2 | 3/2015  | Agranat |

(Continued)

FOREIGN PATENT DOCUMENTS

| CN | 201042078 Y | 3/2008 |
| CN | 202663539 U | 1/2013 |
| CN | 204887466 U | 12/2015 |

OTHER PUBLICATIONS

Widder et al., "Basic principles of MEMS microphones", EDN network, pp. 1-9, https://www.edn.com/Pdf/ViewPdf?contentItemId=4430264, <http://www.edn.com/Pdf/ViewPdf?contentItemId=4430264>May 14, 2014 (May 14, 2014).

(Continued)

*Primary Examiner* — Graham P Smith
*Assistant Examiner* — Jae K Kim
(74) *Attorney, Agent, or Firm* — Lando & Anastasi, LLP (57) ABSTRACT

An apparatus includes a housing having a horn with a mouth and a throat. The mouth of the horn is larger in cross section than the throat of the horn. The housing further includes a waveguide providing communication from the throat of the horn. The apparatus further includes a printed circuit board supported by the housing and a microphone sensor. The microphone sensor is mounted to a printed circuit board. The waveguide provides communication from the throat of the horn to the microphone sensor. The apparatus may be configured to include a housing having a waveguide providing communication to an interior of the housing, a printed circuit board supported by the housing within the interior of the housing, and a microphone sensor.

10 Claims, 13 Drawing Sheets

(56) References Cited

U.S. PATENT DOCUMENTS

| | | | |
|---|---|---|---|
| 8,995,694 B2 | 3/2015 | Vos et al. | |
| 9,351,062 B2 | 5/2016 | Inoda et al. | |
| 2011/0304508 A1* | 12/2011 | Remez | G01S 3/48 |
| | | | 342/442 |
| 2013/0109909 A1* | 5/2013 | van Gerwen | H04R 25/43 |
| | | | 600/25 |
| 2013/0228937 A1 | 9/2013 | Ehrenpfordt et al. | |
| 2013/0298679 A1* | 11/2013 | Snider | G01S 7/521 |
| | | | 73/589 |
| 2015/0139430 A1* | 5/2015 | Miyata | H04R 29/002 |
| | | | 381/56 |
| 2015/0237440 A1* | 8/2015 | Fromel | H04R 1/22 |
| | | | 381/334 |

OTHER PUBLICATIONS

Search Report in Application No. GB1719811.0 dated May 25, 2018.
Baker, Bonnie C., "Bandstop filters and the Bainter topology," Analog Applications Journal, 2015 Texas Instruments Incorporated, 5 pages.
Carter, Bruce, "High-speed notch filters," Amplifiers: Op Amps, 2006 Texas Instruments Incorporated, 8 pages.
Zumbahlen, Hank, "Twin T Notch Filter," Analog Devices, Mini Tutorial, MT-225, 2012 Analog Devices, Inc., 1 page.

* cited by examiner

ULTRASONIC MICROPHONE ENCLOSURE

BACKGROUND

Field of Invention

The present invention is directed to data recording devices, and more particularly to an enclosure that configured to receive external ultrasonic signals, such as the echolocation calls of bats, and to deliver the signals to an ultrasonic microphone.

Discussion of Related Art

There are many applications for automated data collection. In particular, the collection of audio data in the field can be used to monitor populations of wildlife, such as bats, birds, frogs and whales for presence, absence, and abundance data for specific species. Various devices have been created to collect this type of data.

With the increased miniaturization of electronics for consumer devices, a variety of inexpensive SMT (Surface Mount Technology) microphone sensors have been introduced to the market, some suitable for detecting ultrasonic signals. These microphones are designed to be mounted directly on a printed circuit board along with other electronic components using highly automated manufacturing lines. Some of these microphones have top ports, while others have bottom ports. Top port microphones are sensitive to sound waves on the top of the device, that is, on the same side of the printed circuit board as the microphone. Bottom port microphones are mounted over an opening (or via) in the printed circuit board and are sensitive to sound waves on the opposite side of the printed circuit board.

The ultrasonic echolocation calls of bats are typically narrow band, frequency-modulated signals with frequencies of between 20 and 150 kilohertz (noting some bats echolocate at higher and lower frequencies). This corresponds to wavelengths between approximately 0.2 and 1.7 centimeters. When a sound wave encounters an object larger than approximately one quarter wavelength (e.g. as small as 0.05 centimeters), the sound wave can experience a combination of constructive and destructive interference resulting in frequency-dependent distortion of the sound.

Given that a printed circuit board with a surface mounted ultrasonic sensor needs to be enclosed by some kind of housing, it is challenging to design the housing in such a way that an ultrasonic sound wave from outside the housing can reach the sensor with an acceptably low level of distortion. Additionally, the design should be inexpensive to mold and aesthetically pleasing. Mechanical solutions may be constrained by the tolerances of a molding process and can be supplemented with optional electronic solutions to further correct the resulting frequency response of the system.

SUMMARY

One aspect of the disclosure is directed to an apparatus comprising a housing including a horn having a mouth and a throat. The mouth of the horn is larger in cross section than the throat of the horn. The housing further includes a waveguide providing communication from the throat of the horn. The apparatus further comprises a printed circuit board supported by the housing and a microphone sensor. The microphone sensor is mounted to a printed circuit board. The waveguide provides communication from the throat of the horn to the microphone sensor.

Embodiments of the apparatus further may include configuring the horn to have a flat surface so that a cross section of the horn is flatter on one side of the horn. The flat surface may be parallel to the printed circuit board. The waveguide may include an opening in the printed circuit board, with the microphone sensor being mounted on an opposite side of the printed circuit board adjacent to the opening. The horn may be between 0.5 cm and 2.5 cm in length. The housing further may include an additional resonant cavity formed adjacent to the waveguide. The housing further may include an additional resonant cavity formed adjacent to an inside of the horn. In one embodiment, an output of the microphone sensor may be modified by a notch filter. The notch filter may have a limited maximum attenuation in addition to a specified notch frequency and quality factor. In one embodiment, only one op-amp may be used in the notch filter. The notch filter may have feedback current return path that shares current with the return path of one or more frequency limiters in the filter and the ratio of currents is less than 10:1.

Another aspect of the disclosure is directed to a method of detecting ultrasonic signals comprising receiving ultrasonic signals within a horn of a housing, the horn having a mouth and a throat, the mouth of the horn being larger in cross section than the throat of the horn; and directing ultrasonic signals to a microphone sensor secured to a printed circuit board by a waveguide providing communication from the throat of the horn to the microphone sensor.

Embodiments of the method further may include configuring the horn to have a flat surface so that a cross section of the horn is flatter on one side of the horn. The flat surface may be parallel to the printed circuit board. The waveguide may include an opening in the printed circuit board, with the microphone sensor being mounted on an opposite side of the printed circuit board adjacent to the opening. The method further may comprise removing or attenuating a desired band of frequencies. Removing or attenuating the desired band of frequencies may include forming an additional resonant cavity in the housing adjacent to the waveguide or adjacent an inside of the horn. Removing or attenuating the desired band of frequencies may include modifying an output of the microphone sensor by a notch filter. The notch filter may have a limited maximum attenuation in addition to a specified notch frequency and quality factor. In one embodiment, only one op-amp may be used in the circuit.

Yet another aspect of the disclosure is directed to an apparatus comprising a housing including a waveguide providing communication to an interior of the housing, a printed circuit board supported by the housing within the interior of the housing, and a microphone sensor. The microphone sensor is mounted to a printed circuit board. The waveguide provides communication to the microphone sensor.

Embodiments of the apparatus further may include configuring the waveguide to include an opening in the printed circuit board, with the microphone sensor being mounted on an opposite side of the printed circuit board adjacent to the opening. In one embodiment, an output of the microphone sensor is modified by a notch filter. The notch filter may have a limited maximum attenuation in addition to a specified notch frequency and quality factor. In one embodiment, only one op-amp may be used in the notch filter. The notch filter may have feedback current return path that shares current with the return path of one or more frequency limiters in the filter and the ratio of currents is less than 10:1.

BRIEF DESCRIPTION OF THE DRAWINGS

Aspects and embodiments of the invention are described in detail below with reference to the accompanying drawings. It is to be appreciated that the drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Aspects and embodiments of the present disclosure are directed to an exponential horn incorporated into a housing of an enclosure configured to record ultrasonic signals produced by wildlife, such as bats. In one embodiment, the horn includes a semi-circular cross-section having a flat surface parallel to a printed circuit board secured within the housing to minimize a volume of the housing for aesthetic and functional purposes. The dimensions of the acoustic horn can be tuned to optimize the directionality, free gain, and high-pass filter cut-off suitable to the application. At a throat of the horn, a waveguide provides a communication pathway to direct the sound wave through an opening in a wall of the housing and through a channel sealed against either the printed circuit board opening (or via) opposite a bottom-port microphone, or directly to a top-port microphone. If a bottom-port microphone is employed, the opening or via in the printed circuit board forms part of the waveguide.

The dimensions of the waveguide may be constrained by the tolerances and capabilities of a given molding process. Larger dimensions and tolerances are less expensive to mold, but may result in undesirable frequency response artifacts. The waveguide and the horn dimensions can be tuned to optimize for flat frequency response with the exception of a single resonant peak within a frequency bandwidth of interest. The undesired resonance can then be cancelled either mechanically or electronically. In one embodiment, when cancelling or reducing undesired resonance mechanically, a Helmholtz resonator can be added by creating an additional cavity where the waveguide meets the printed circuit board. The dimensions of the cavity can be tuned to match the resonant frequency of the waveguide resulting in a flattening of the frequency response. The mechanical solution requires relatively tight or exact molding tolerances. Alternatively, in another embodiment, when cancelling or reducing undesired resonance electronically, an electronic notch filter can be incorporated in the analog electronics receiving the electrical output of the ultrasonic sensor to accomplish the same task. The notch filter can be tuned more precisely but requires additional expense for the electronic components and printed circuit board real-estate.

Figure 1:
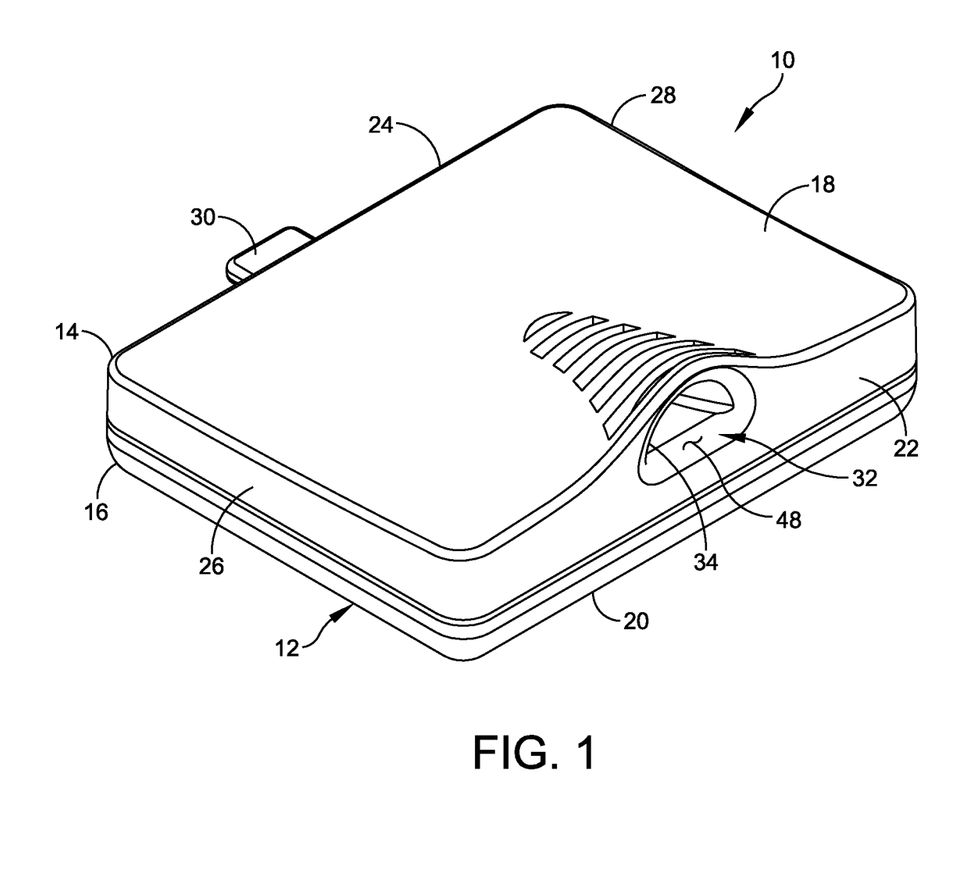
FIG. 1 is a perspective view of an enclosure of an embodiment of the present disclosure.

Referring to the drawings, and more particularly to FIG. 1, an ultrasonic microphone enclosure is generally indicated at 10. As shown, the enclosure 10 includes a two-part housing, generally indicated at 12, which includes a top housing part 14 and a bottom housing part 16. In one embodiment, the top and bottom housing parts 14, 16 are secured to one another by a suitable fastener or multiple fasteners, such as machine screw or self-tapping screw fasteners, to create a cavity within an interior of the housing. The housing 12 of the enclosure 10 is configured to have a top 18, a bottom 20, a front 22, a back 24 and opposing sides 26, 28 to create a generally thin, compact configuration. In certain embodiments, the housing 12 of the enclosure 10 can be fabricated from a suitable lightweight material, such as plastic, and formed by a molding process. In other embodiments, the housing 12 can be fabricated from a lightweight metal, such as aluminum.

The enclosure 10 is designed to enable a user to record and listen to wildlife sounds, e.g., bat calls, in real-time on a mobile device. In certain embodiments, the enclosure 10 can be configured to operate with any type of mobile device. The enclosure 10 enables data to be displayed real-time on the mobile device, with GPS enabled devices being able to tag each recording with an exact location. Accordingly, recordings can easily be transferred from the device to any computer for further analysis and reporting. The enclosure 10 includes a connector 30 provided at the back 24 of the housing 12 of the enclosure to electrically and mechanically connect the enclosure to the mobile device. The type and configuration of the connector 30 depends on the type of port provided in the mobile device. Other types of connectors are also contemplated. For example, the connector can be configured to mate with a cable, which in turn mates with a mobile device or a computer. Once the connector 30 of the enclosure 10 is plugged into the mobile device, the user can immediately monitor, record and analyze bat echolocations. Suitable software, e.g., in the form of a downloadable application, enables the user to use the enclosure with the mobile device.

Figure 2:
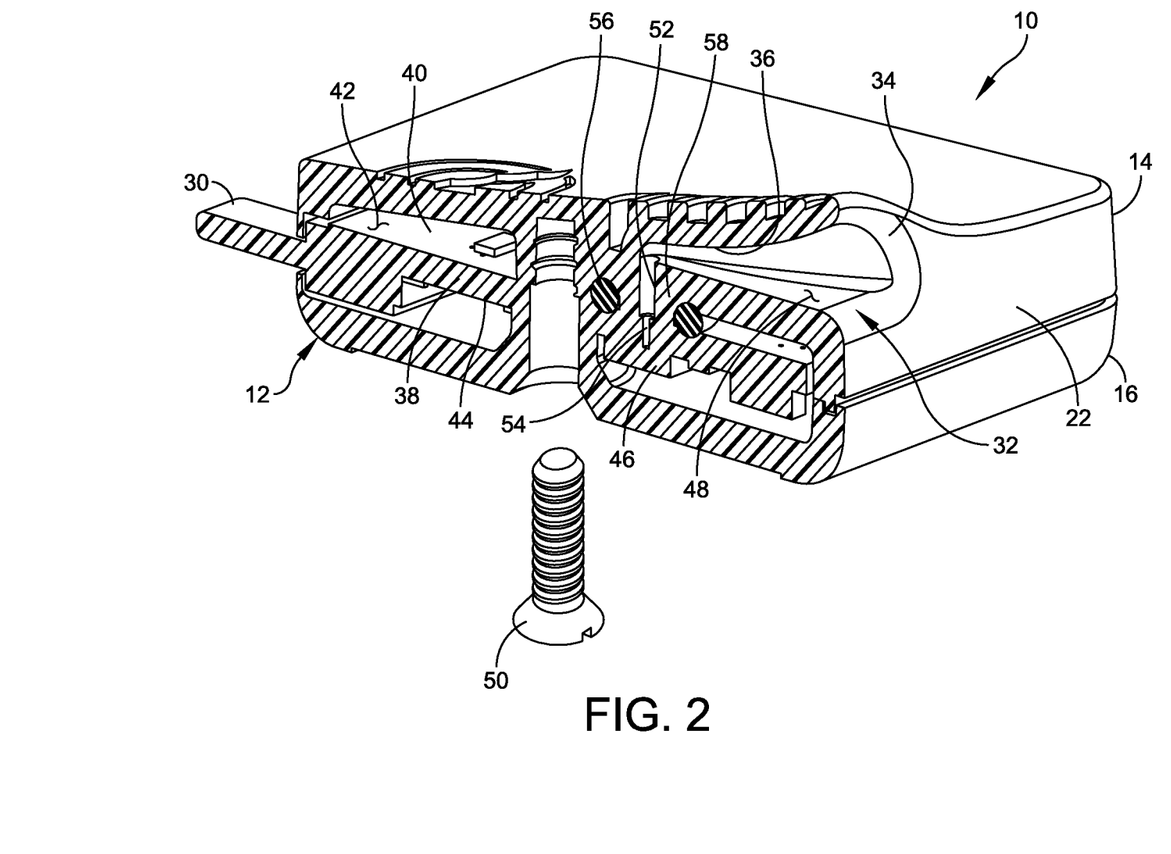
FIG. 2 is a perspective cross-sectional view of the enclosure shown in FIG. 1.

Referring additionally to FIG. 2, the top housing part 14 of the housing 12 includes an acoustic exponential horn generally indicated at 32 to receive ultrasonic signals to be recorded by the enclosure 10. The acoustic horn 32 is formed to receive ultrasonic signals at an open mouth 34 formed at the front 22 of the top housing part 14 of the housing 12, and direct the sound toward a closed throat 36 formed at a middle of the top housing part of the housing. A change in cross-sectional area from the mouth 34 to the throat 36 provides free-gain for on-axis signals, which improves the signal-to-noise ratio while attenuating undesirable off-axis sounds. An exponential shape of the horn 32 helps match impedance resulting in a relatively flat frequency response except for a high-pass filter and ringing caused by reflections over the length of the horn. Other shapes, such as circular arcs or splines, may also have acceptable frequency response.

The enclosure 10 further includes a printed circuit board (PCB) 38, which is disposed within an interior 40 of the housing 12 and is positioned adjacent to the throat 36 of the horn 32. As shown, the PCB 38 includes a top surface 42 and a bottom surface 44, and is positioned centrally within the interior 40 of the housing 12 generally along a plane defined by the intersection of the top housing part 14 and the bottom housing part 16. In one embodiment, the PCB 38 includes a microphone 46 mounted on the bottom surface 44 of the PCB. As will be discussed in greater detail below, the microphone 46 is used to detect sounds, such as bat calls. In one embodiment, the microphone is a SiSonic™ surface mount MEMS microphone provided by Knowles Electronics, LLC of Itasca, Ill. under part number PU0410LR5H-QB.

The shape and size of the mouth 34 of the horn 32 can be adjusted to control the directionality of the horn and the magnitude of the gain. A circular cross section provides more symmetrical frequency response at different off-axis angles, but may also require a larger housing. Given the objective of getting the sound to the PCB 38, a semi-circular cross-section of the mouth 34 of the horn 32 allows for a flat surface 48 parallel with the plane of the PCB 38 to minimize a volume of the housing 12. The top housing part 14 and the bottom housing part 16 of the housing 12 are configured to secure the PCB 38 in place when securing the housing parts together with a suitable fastener, such as a machine screw or self-tapping screw fastener 50. Gaskets and other component parts may be provided to complete the securement of the PCB 38 in the housing 12.

Figure 3:
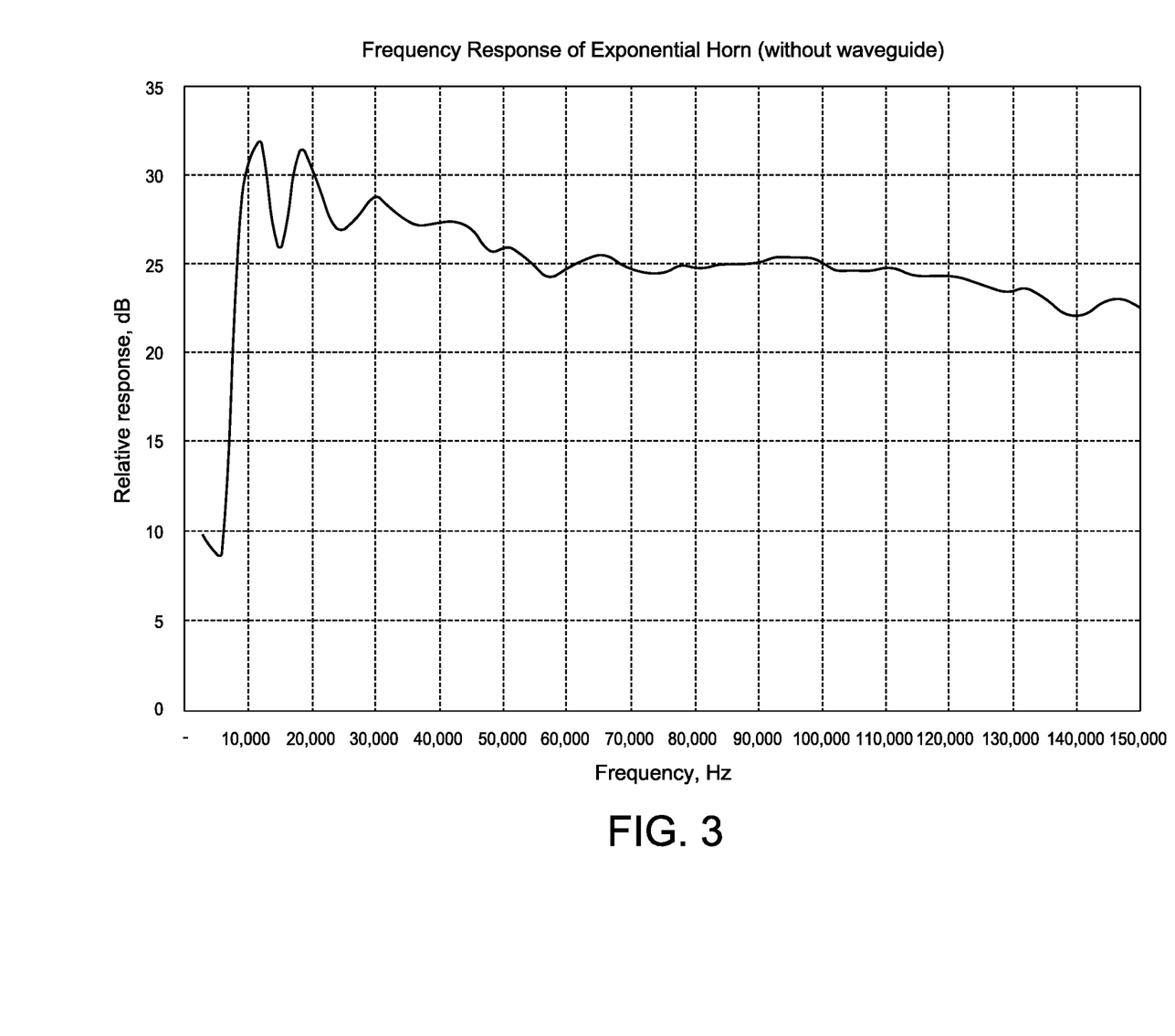
FIG. 3 is a graph showing frequency response of an exponential horn without waveguide.

FIG. 3 is a graph that plots a frequency response of an on-axis signal formed by the acoustic horn 32 as measured at the throat 36 of the horn without the addition of a waveguide. The length of the horn (1.3 cm) contributes to the high pass filter and low frequency ringing in the frequency response.

Figure 4:
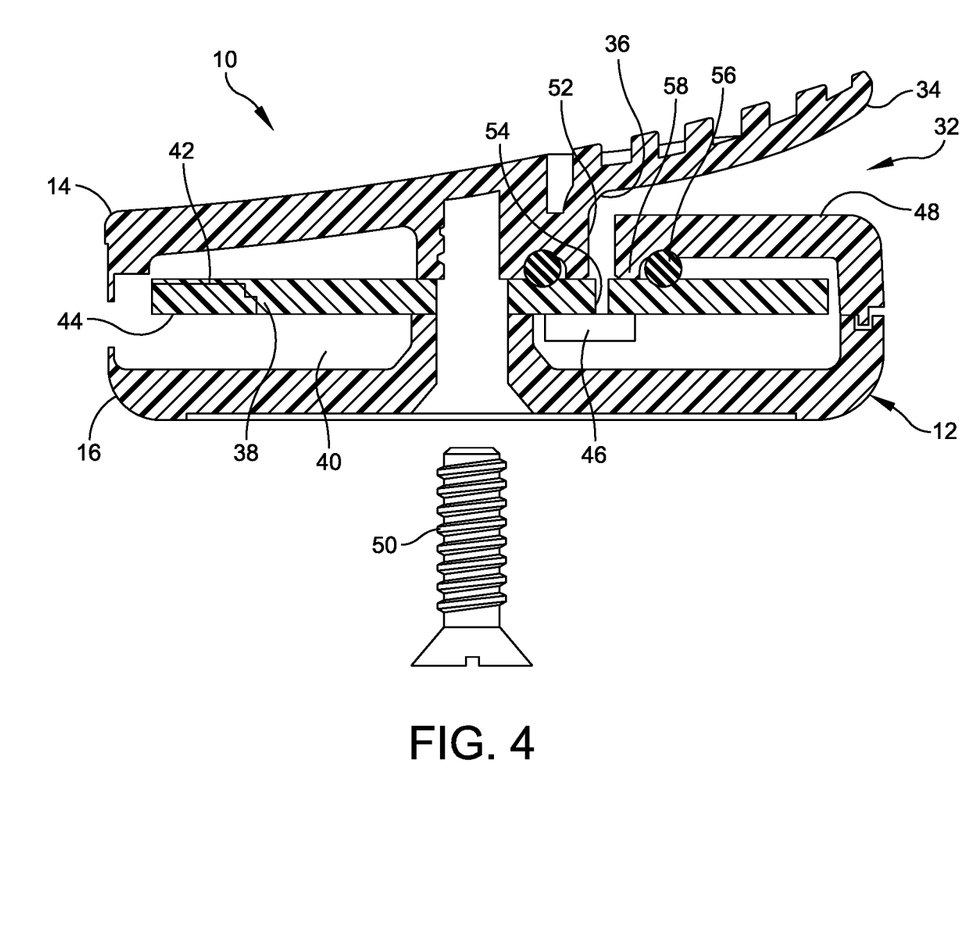
FIG. 4 is a cross sectional view of the enclosure shown in FIG. 1.

Referring to FIG. 4, in one embodiment, the throat 36 of the acoustic horn 32 is connected to a waveguide 52, which extends toward the PCB 38 to provide a communication pathway to the PCB. As shown, the waveguide 52 is formed in the top housing part 14 of the housing 12, and is sealed against an opening or via 54 formed in the PCB 38. As shown, the microphone 46 embodies a bottom-port surface-mounted microphone, which is mounted on the bottom surface of the PCB. A gasket 56 is used to provide a seal between the waveguide 52 and the PCB 38.

In one embodiment, the exponential horn 32 is formed with a semicircular cross-section with 0.6 cm radius at the mouth and a length of 1.3 cm tapering to a radius of 0.1 cm. The horn 32 is terminated behind the throat 36 with a quarter-spherical shape between the horn and a surface of the housing 12. The waveguide 52 is formed with a diameter of 0.1 cm through a wall 58 of the top housing part 14, and extends to the top surface 42 of the PCB 38 over a length of 0.3 cm. It should be noted that the waveguide 52 can be configured to taper slightly wider toward the PCB 38 with some draft angle, and has a small radius at the end to make it easier to mold. The radius adds strength to a mold pin forming the opening to improve the reliability of the tool.

As shown, the smaller opening or via 54 formed in the PCB is aligned with the waveguide 52 to complete a sound wave path from the horn 32, through the waveguide, and to the microphone 46. The arrangement is such that the bottom-port microphone 46 is mounted on the opposite, bottom side 44 of the PCB 38, such that the port is lined up with the opening or via 54. The gasket 56, which can embody an O-ring, provides a seal between the PCB 38 and the housing 12.

Figure 5:
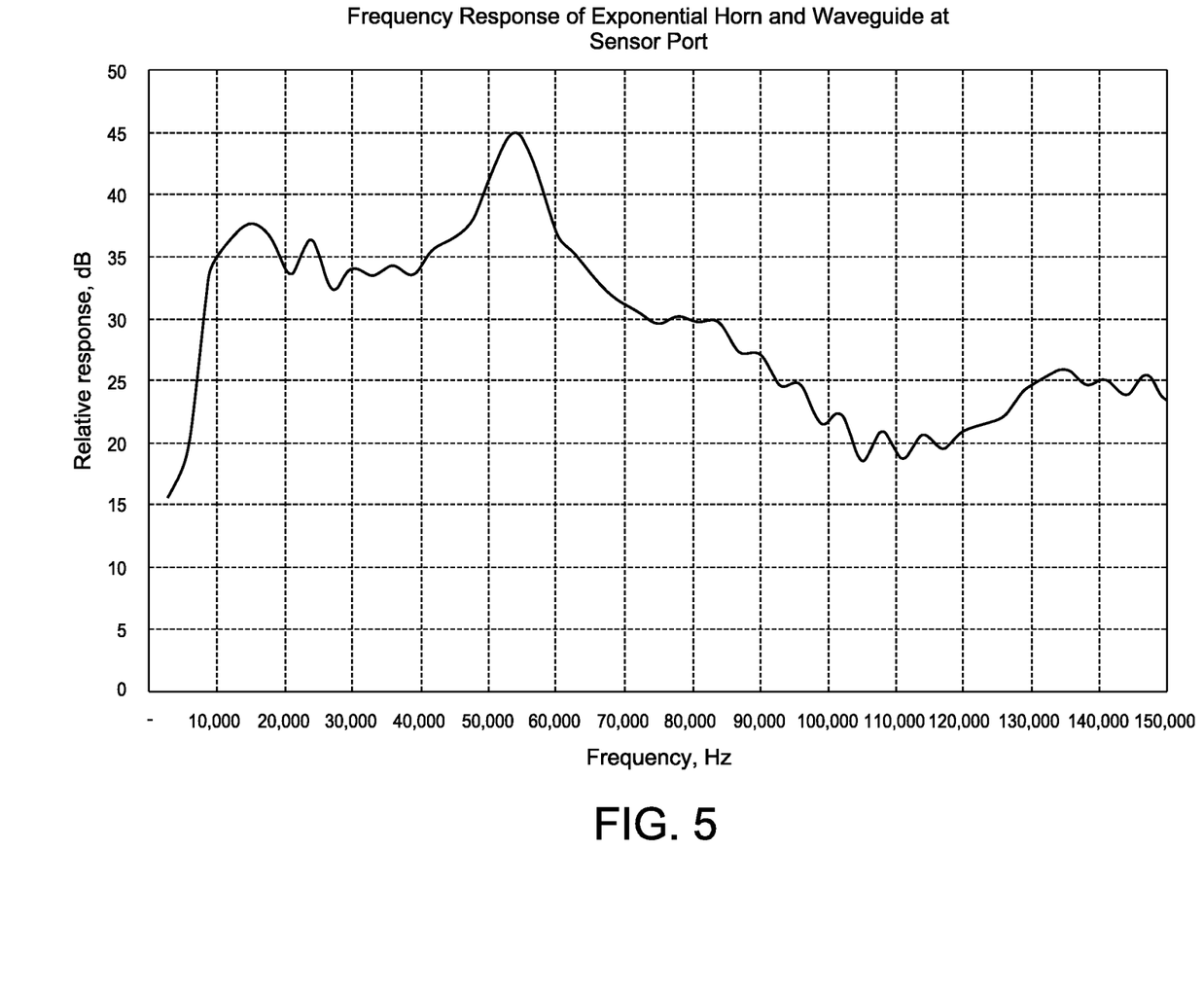
FIG. 5 is a graph showing frequency response of an exponential horn with waveguide at sensor port.

The frequency response of the arrangement shown in FIG. 4 is represented by FIG. 5, which plots a frequency response of an on-axis signal as measured at the bottom-port microphone 46 through the opening 54 in the PCB 38 and the cylindrical waveguide 52 to the surface of the housing 12 at the throat 36 of the horn 32. It should be noted that there is a strong sensitivity peak at approximately 45-55 kHz caused by a geometry of the waveguide 52. With smaller features and tighter tolerances, it may be possible to improve on the frequency response. However, the resulting design may be difficult if not impossible to reliably and affordably mold.

There are two ways to compensate for the undesirable sensitivity peak. One way is to add an additional acoustic feature, such as a Helmholtz Resonator, to absorb energy at a certain wavelength so as to flatten the frequency response of the system. Another way is to add an electronic notch filter tuned to a certain frequency to the same effect.

Figure 6:
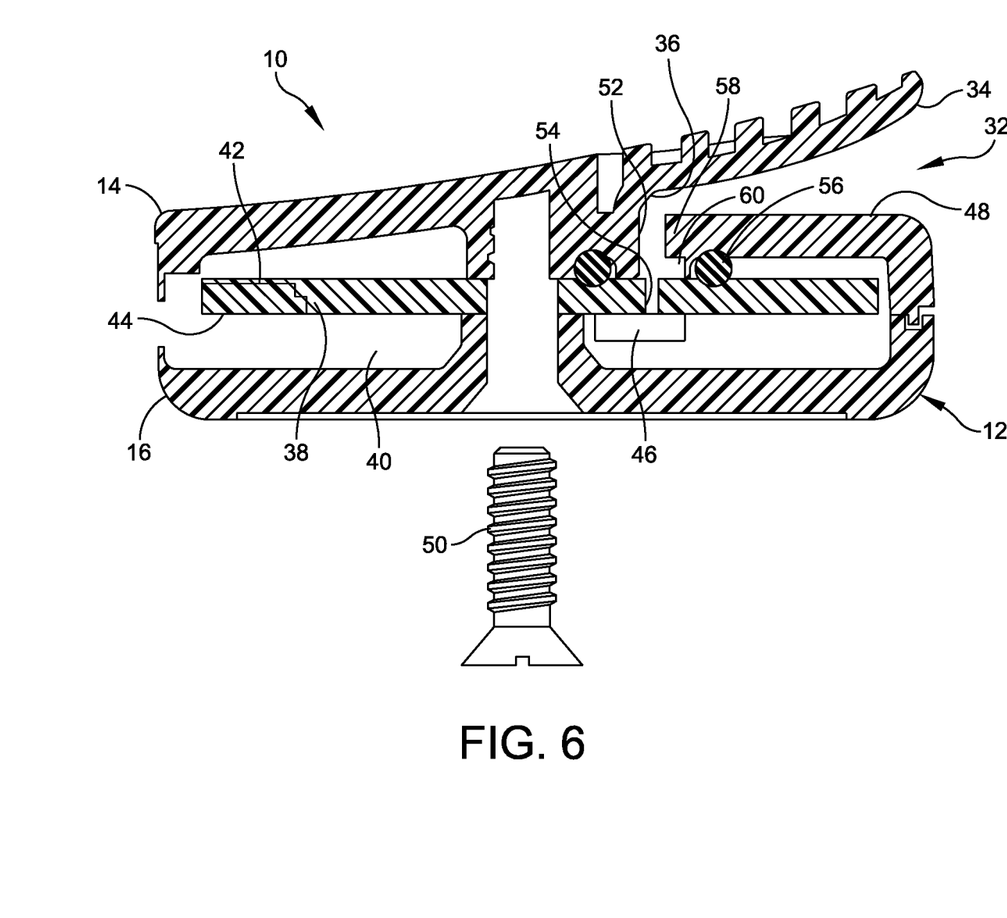
FIG. 6 is a cross sectional view of an enclosure of another embodiment similar to FIG. 3 showing a resonant cavity.
Figure 7:
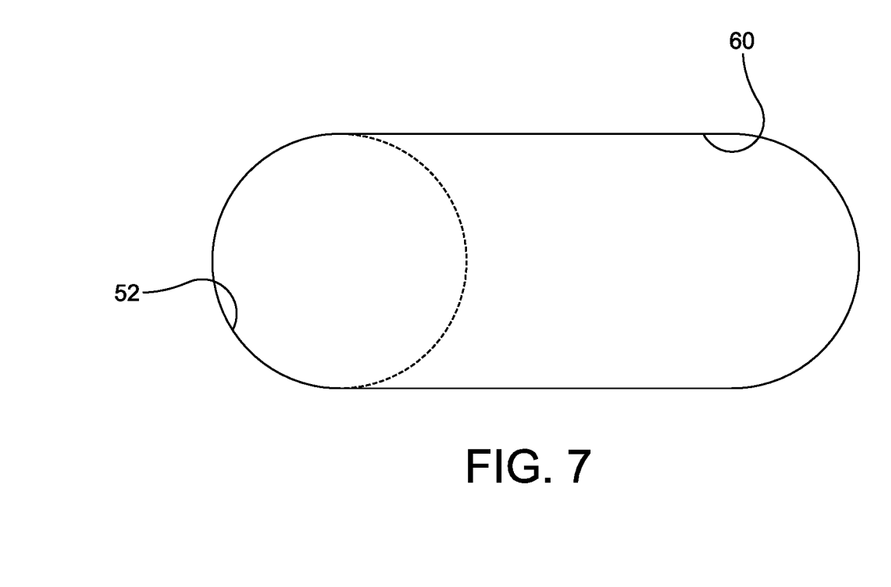
FIG. 7 is a cross sectional view of the resonant cavity and a waveguide of the enclosure.
Figure 8:
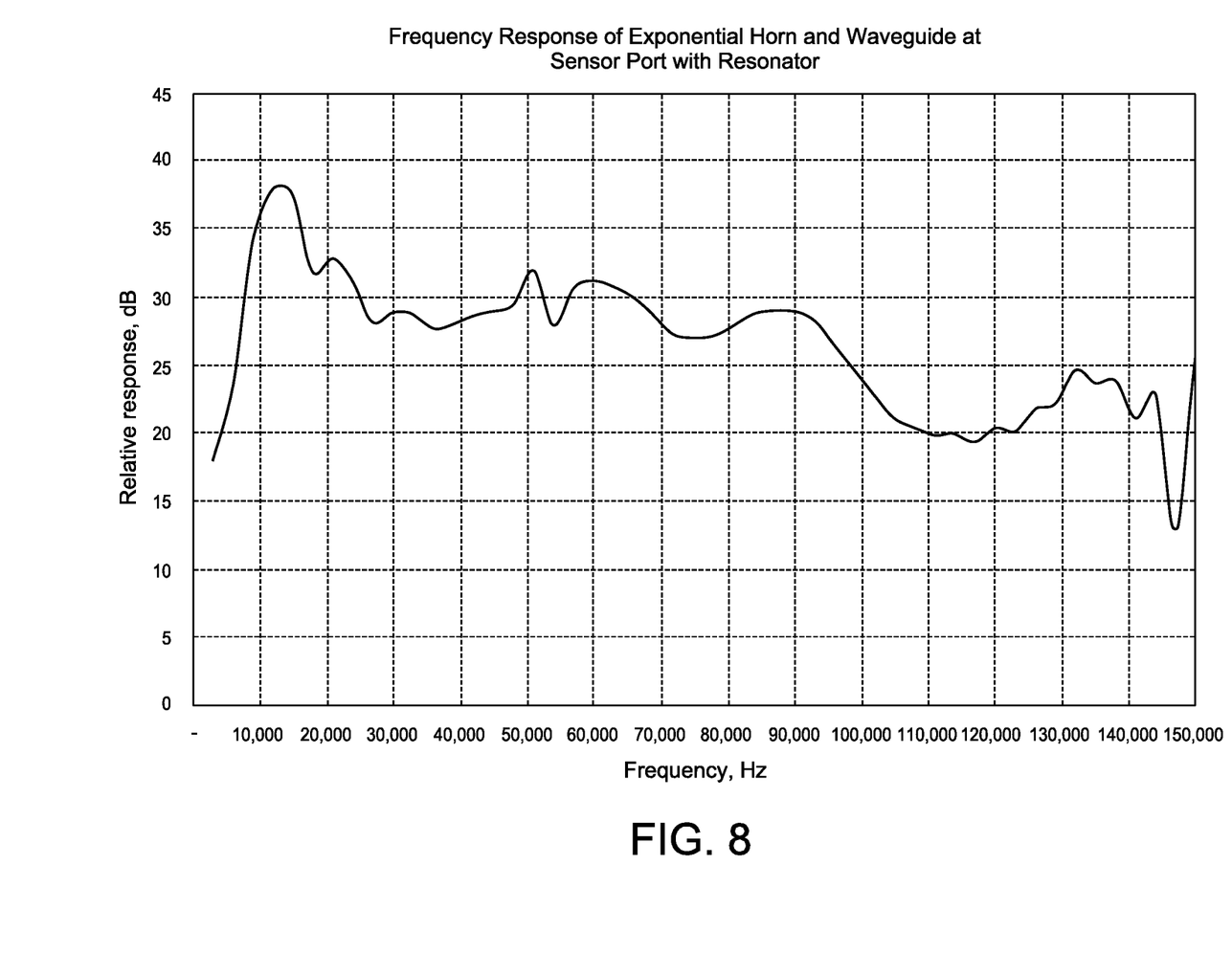
FIG. 8 is a graph showing frequency response of an exponential horn with waveguide at sensor port with resonator.

FIG. 6 illustrates the enclosure 10 shown in FIG. 4, including a resonant cavity 60 formed in the top housing part 14 of the housing 12. The resonant cavity 60 is configured to function as a Helmholtz Resonator tuned to cancel the resonant peak caused by the waveguide 52. As shown, the addition of a Helmholtz Resonator is created by forming a chamber in the top housing part 14, which is connected to the waveguide 52. The resonant cavity 60 can be formed adjacent to the PCB 38 by the molding process. FIG. 7 illustrates one possible cross-section of the waveguide 52 and resonant cavity 60. In one embodiment, the resonant cavity 60 has a length of 0.26 cm, a width of 0.10 cm and a height of 0.06 cm. The waveguide 52 has a height of 0.30 cm. FIG. 8 illustrates the resulting frequency response when the resonant cavity 60 is tuned properly resulting in a flatter frequency response. The tolerance required to properly tune the system may be less than 0.005 cm.

In one embodiment, as mentioned above, the exponential horn 32 has a length of 1.3 cm, with a semicircular cross-section of 0.6 cm radius at the mouth 34 and a 0.1 cm radius at the throat 36. The throat 36 of the horn 32 is closed off with a quarter-sphere between the horn and flat housing wall 48. FIG. 8 illustrates a frequency response of an on-axis signal as measured at the bottom-port microphone 46 of the enclosure 10 shown in FIG. 6, with the resonant cavity 60 forming a Helmholtz Resonator tuned to flatten the frequency response of the system. The plot represents the frequency response as measured at the microphone port. These dimensions would be suitable for recording bats and provide a reasonably flat frequency response between 9 and 200 kHz.

A communication pathway is needed for the sound to propagate from the throat 36 of the horn 32 to the surface of the microphone 46 mounted to the PCB 38. The cylindrical waveguide 52 is molded (especially with draft, e.g., widening, toward the PCB 38). However, different shapes and sizes of waveguides can adversely affect the frequency response. Longer waveguides can produce ringing in the frequency response and wider waveguides can dampen the ringing but also result in lost compression from the horn. Molded housings also have limitations on wall thickness, draft angles, feature sizes, and tolerances. Working with lower tolerances and larger features improves mold reliability and reduces molding costs.

Figure 9:
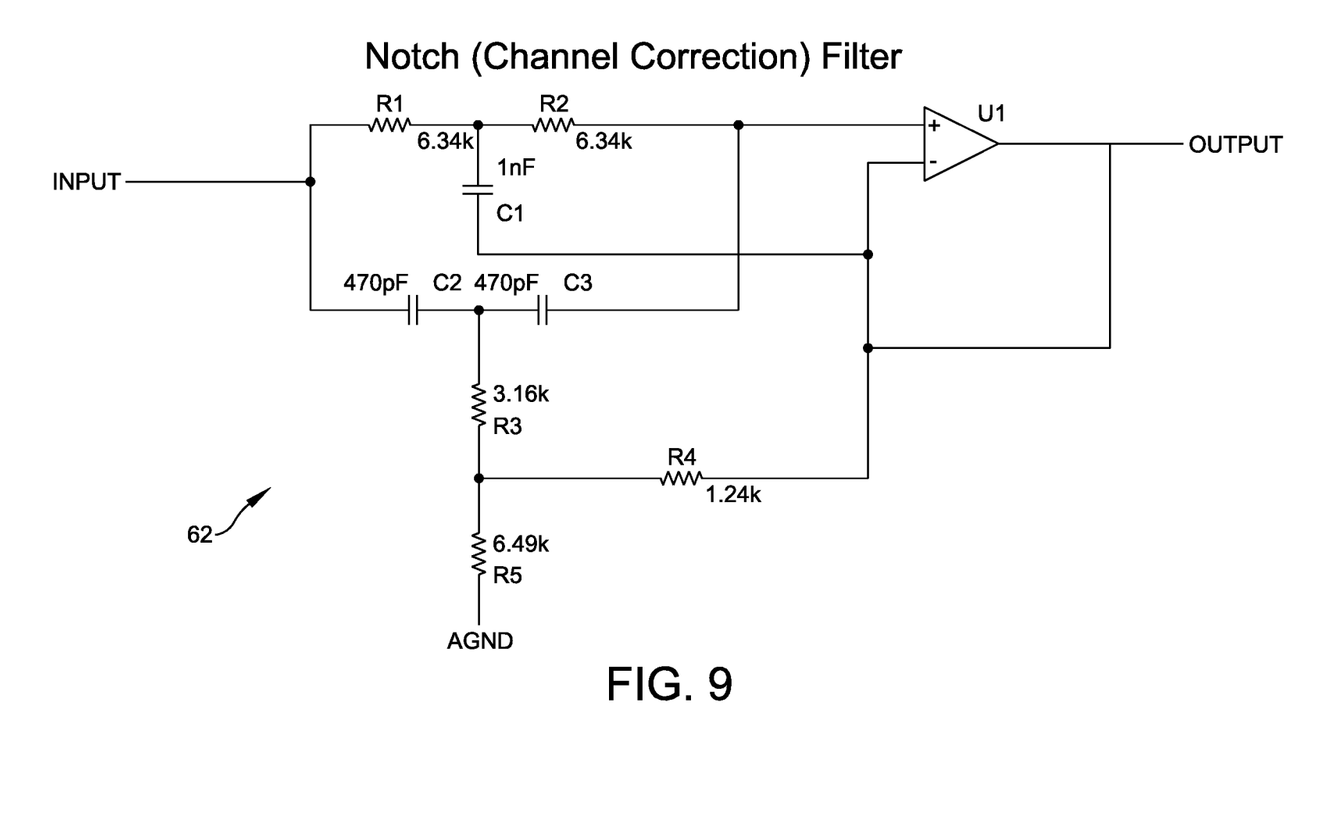
FIG. 9 is a schematic diagram of a limited Sallen-Key notch filter.
Figure 10:
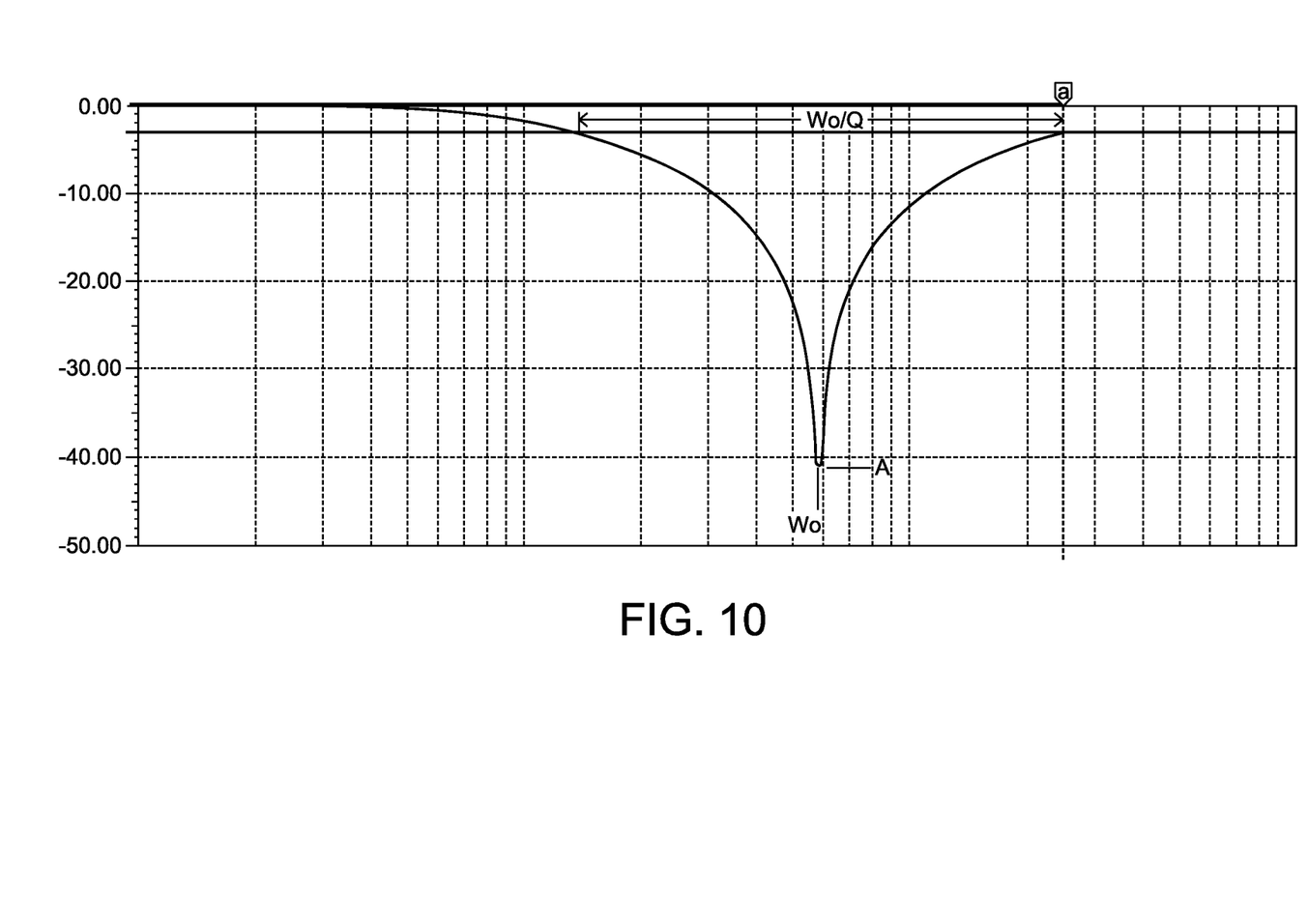
FIG. 10 is a graph showing frequency response with a notch filter.

Alternatively, in another embodiment referenced in part to FIG. 9, an electronic notch filter, generally indicated at 62, can be more precisely tuned, but requires additional electronic components increasing cost and size. Specifically, the notch filter 62 is mounted on the PCB 38 and used to remove or attenuate a desired band of frequencies. The notch filter 62 circuit components may include, for example, resistors, capacitors and operational amplifiers, which are surface-mount parts incorporated into the design of the PCB 38. In one example, the operational amplifier may be precision operational amplifier chip offered by Texas Instruments under model no. OPA320. A notch filter may be defined by three quantities: a peak attenuation frequency (Wo) of the notch filter, a quality factor (Q) of the notch filter, and a maximum attenuation of the notch filter. Reference can be made to a frequency response shown in FIG. 10. The peak frequency, Wo, is the point of maximum attenuation. The quality factor describes the range or width of the attenuated area, usually measured referenced to the −3 dB (also known as half-power) points of the frequency response, as known as the band-stop width of the filter. The quality factor is expressed as a factor of Wo. For example, if Wo of a filter is 50 KHz, and the band-stop is described as having −3 dB points at 40 KHz and 60K, then the band-stop width is (BWs) 20 KHz and the quality factor is defined as:

$$Q = Wo/BWs = 2.5$$

In many filters, a desired goal is to completely remove certain frequencies. If possible, this would result in an infinite attenuation. In reality, it usually results in a 99% to 99.99% reduction, which corresponds to −40 dB to −80 dB attenuation. Often the maximum attenuation (A) is a factor of circuit parasitics and cannot be precisely controlled if totality is the desired outcome.

Many applications call for the partial removal or limited attenuation of a signal. This class of filters will have a desired attenuation much less than the maximum possible with a given circuitry. However, many limited attenuation filters will utilize three or more operation amplifiers (op-amps), resulting in higher space utilization and higher cost considering the amplifiers themselves and their supporting components.

As referenced above, FIG. 9 illustrates an exemplary notch filter circuit. As shown, a space saving alternative for a limited attenuation notch filter is presented in FIG. 9. The filter is based on a Sallen-Key notch filter, but with the addition of R4 and R5. For a strict Sallen-key filter, R5=0 ohms and R4 is infinite (or rather R5 is shorted and R4 deleted). For a strict the Sallen-Key narrow-band notch filter, the design equations are:

$$R1 = R2 = 2*R3 \quad \text{(Equation 1)}$$

$$C2 = C3 = C1/2 \quad \text{(Equation 2)}$$

$$Wo = 1/(4*PI*R3*C2) \quad \text{(Equation 3)}$$

$$R5 = 0, R4 = \text{infinite} \quad \text{(Equation 4)}$$

$$Q = 0.25 \quad \text{(Equation 5)}$$

When R4 not infinite and R5, not 0, the design is very similar to a variation of the twin-T notch filter with Q-control except that the lower node of C1 is connected to ground instead of the output of the op-amp (connecting to the output gives slightly better response than connecting to ground). Now, $$Q = R5/(4*R4) \quad \text{(Equation 6)}$$

This is true only if R3 is greater than R4 and R5 by a factor of 10, or (better yet), there is an op-amp separating R4 and R5 from R3 in a voltage follower configuration. The maximum attenuation is determined by circuit parasitic and is usually −40 dB or lower.

Should R3 be less than 10 times R4 or R5, the maximum attenuation will rise toward 0 dB. Equations (3) and (6) will no longer be true, and the new equations determining Wo, Q, and A are not useful for design because of interdependencies among the equations. In addition, normal component tolerances and manufacturing issues provided too much variation in performance.

However, two advances in technology now allow for the novel use of the notch filter 62 shown in FIG. 9 when designing limited attenuation circuits. The first advance is relatively cheap components with tighter tolerances than previously available. The second advance is fast simulation tools that allows for iterative design in a timely fashion. For the circuit, it is known that:

Wo is largely a function of R3 and C2 so long as equations (1) and (2) are true and where equation (3) is an approximation.

Q is largely a function of R5 and R4 where equation (6) is an approximation.

A is largely a function of the ratio of R3 and R5. As R3/R5 becomes smaller, the attenuation moves toward 0 dB. An initial starting point is a 1:1 ratio.

By setting initial values, running a simulation, collecting results, and adjusting the components appropriately, the desired characteristics may be achieved in short order.

Figure 11:
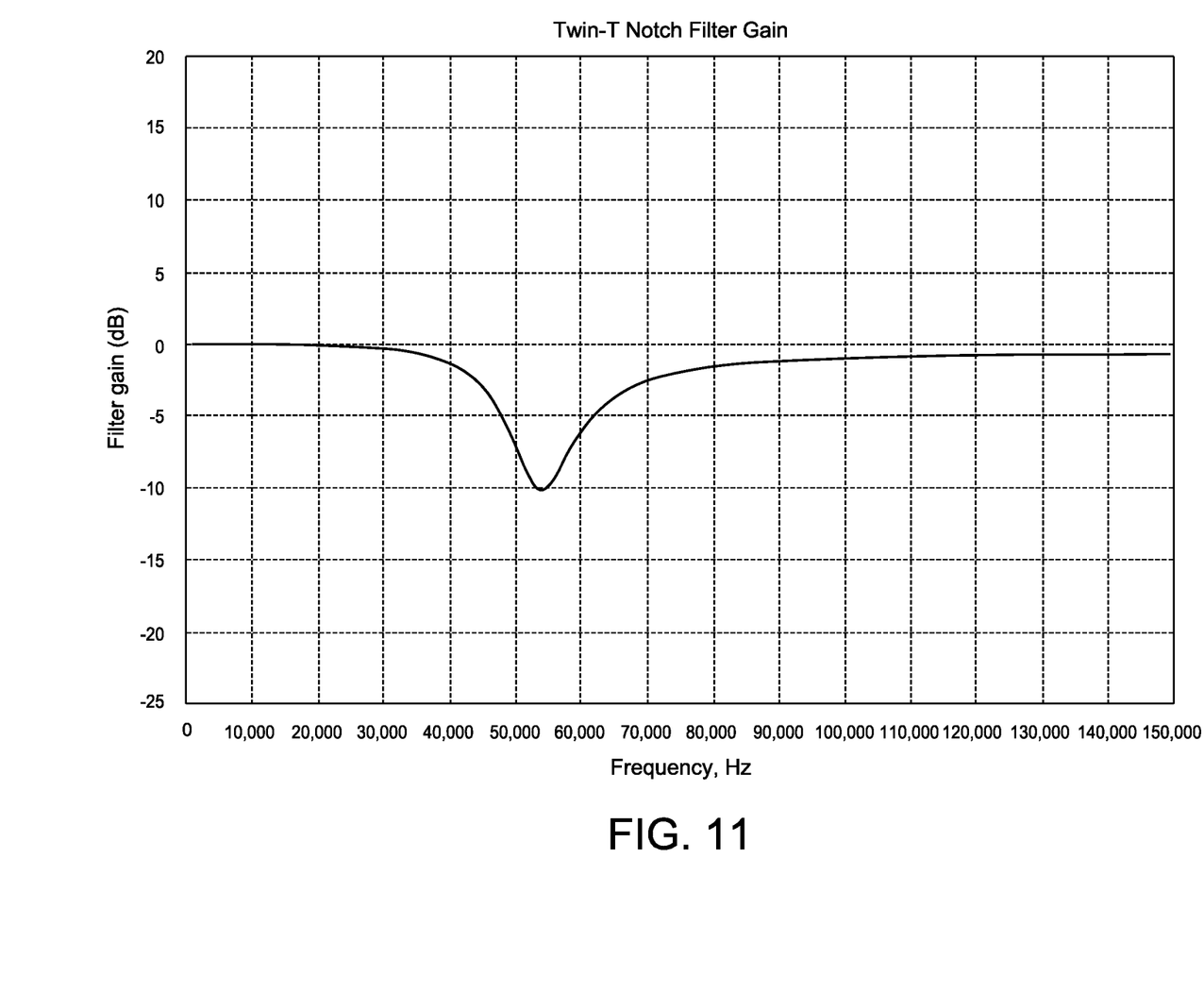
FIG. 11 is a graph showing frequency of a limited Sallen-Key notch filter gain.
Figure 12:
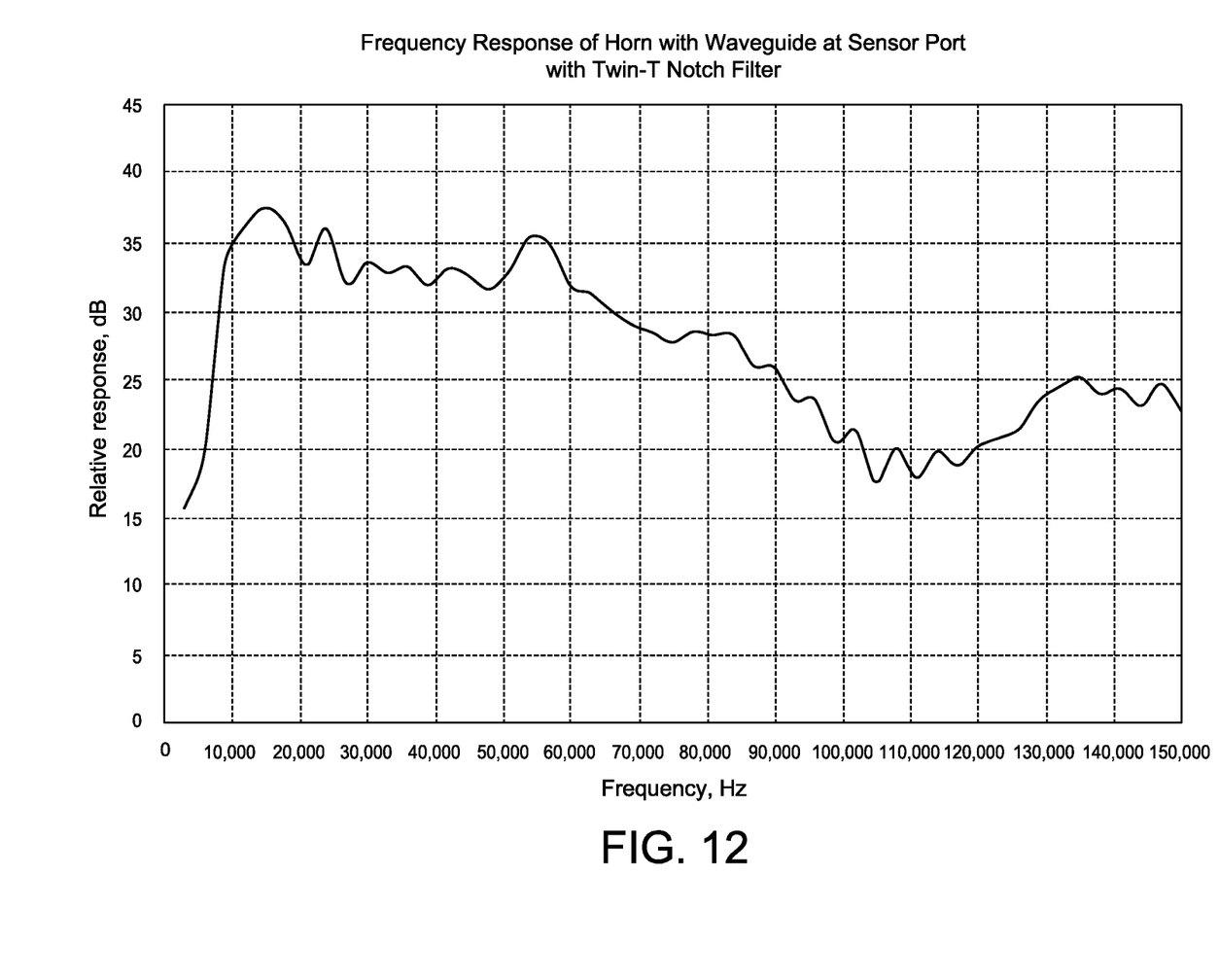
FIG. 12 is a graph showing frequency response of an exponential horn with waveguide at sensor port with a limited Sallen-Key notch filter.

FIG. 11 illustrates a gain response of a limited Sallen-Key notch filter circuit. FIG. 12 illustrates a frequency response of an on-axis signal as measured at the bottom-port sensor of the enclosure shown in FIG. 4 as modified by the limited Sallen-Key notch filter circuit.

Figure 13:
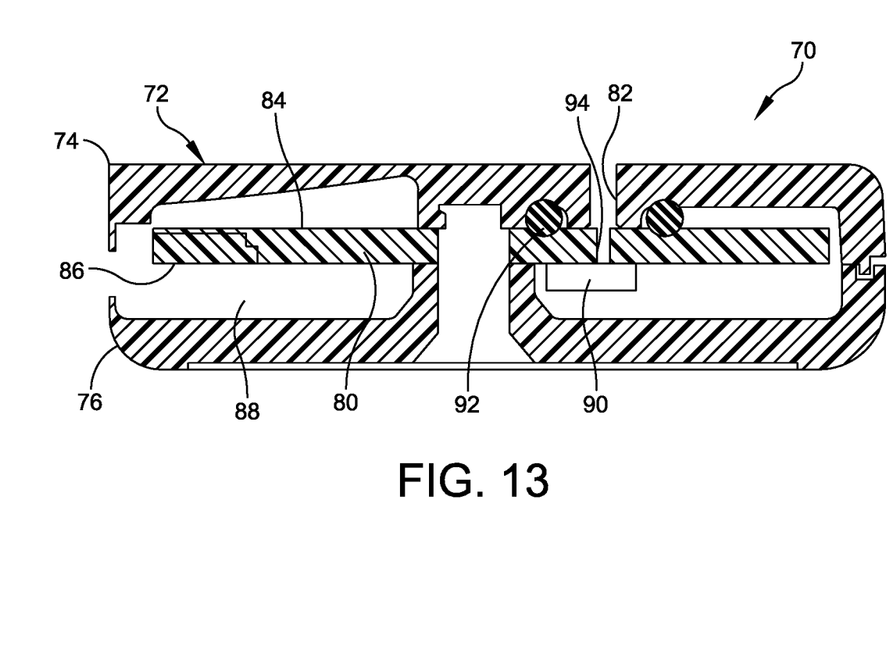
FIG. 13 is a cross sectional view of an enclosure of another embodiment of the present disclosure.

Referring to FIG. 13, an ultrasonic microphone enclosure of another embodiment of the disclosure is generally indicated at 70. Enclosure 70 is substantially similar to enclosure 10 in that the enclosure 70 includes a two-part housing, generally indicated at 72, which includes a top housing part 74 and a bottom housing part 76 configured to create an interior and secured to one another by suitable fasteners. As shown, the top housing part 74 of the housing 72 of the enclosure 70 lacks the acoustic horn, and instead includes a flat outer surface 78. The enclosure 70 further includes a PCB 80, which is disposed within the interior of the housing 72 and is positioned adjacent a waveguide 82 formed in the top housing part 74 of the housing. As shown, the PCB 80 includes a top surface 84 and a bottom surface 86, and is positioned centrally within an interior 88 of the housing 72 generally along a plane defined by the intersection of the top housing part 74 and the bottom housing part 76.

In the shown embodiment, the PCB 80 includes a microphone 90 mounted on the bottom surface 86 of the PCB. In this embodiment, the waveguide 82 extends toward the PCB 80, and is sealed against an opening or via 92 formed in the PCB by a gasket 94 used to provide a seal between the waveguide and the PCB. The smaller opening 92 in the PCB 80 is aligned with the waveguide 82 to complete a sound wave path to the microphone 90. The arrangement is such that the bottom-port microphone 90 is mounted on the opposite bottom surface 86 of the PCB 80, such that the port is lined up with the opening or via 92. The gasket 94, which can embody an O-ring, provides a seal between the PCB 80 and the housing 72 of the enclosure.

Although a bottom mount microphone or microphone sensor is shown and described herein, it should be understood that a surface mount microphone may be secured to the top surface of the PCB.

In a certain embodiment, power would be provided through the connector and provided by the battery of the mobile device. However, similar stand-alone enclosure could be devised with batteries, screen, CPU, etc., where an enclosure embodying the geometries and filters of the horn are provided. The PCB would also contain some kind of micro-controller or processor to communicate with the mobile device over a digital interface. It may also contain an analog-to-digital converter to convert the analog signal from the microphone sensor into a stream of digital samples that would be forwarded to the mobile device. The functions provided by the mobile device could also instead be incorporated into the design e.g., by adding batteries, touch screen, memory, processors, etc.

In addition to the enclosure, the PCB of the enclosure may also include or be configured to include means to analyze the recorded data (specialized computer software). Data analysis is performed on the PCB or may be transferred to another device, such as a PC. The transfer of the audio data may be facilitated by the removable digital mass storage device. A flash or SD (example of possible formats) card reader connected to the enclosure and electronically coupled to the PCB may provide the analysis software with access to the audio data. The data analysis might include detection and classification of bats, data compression, and/or the transformation of acoustic sound into audible sounds played through headphones or speakers.

As mentioned above, the embodiment of the enclosure is particular suited for recording and storing sounds generated from wildlife. The enclosure is particularly suited for recording and storing sounds generated from bats, for example.

As mentioned above, the connector could go through an extension cable to the mobile device, or a non-mobile computer. Additionally, the embodiment could be self-contained, e.g., with batteries, screen, CPU, etc., without requiring an external mobile device.

It is to be appreciated that this invention is not limited in its application to the details of construction and the arrangement of components set forth in the following description or illustrated in the drawings. The invention is capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. In addition, it is to be appreciated that the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

The invention claimed is:

1. An apparatus comprising:
   a housing including a horn having a mouth and a throat, the mouth of the horn being larger in cross section than the throat of the horn, the housing further including a waveguide providing communication from the throat of the horn;
   a printed circuit board supported by the housing; and
   a microphone sensor, the microphone sensor being mounted to a printed circuit board, the waveguide providing communication from the throat of the horn to the microphone sensor,
   wherein the horn includes a flat surface so that a cross section of the horn is flatter on one side of the horn.

2. The apparatus of claim 1, wherein the flat surface is parallel to the printed circuit board.

3. The apparatus of claim 1, wherein the waveguide includes an opening in the printed circuit board, with the microphone sensor being mounted on an opposite side of the printed circuit board adjacent to the opening.

4. The apparatus of claim 1, wherein the horn is between 0.5 cm and 2.5 cm in length.

5. The apparatus of claim 1, wherein the housing further includes an additional resonant cavity formed adjacent to the waveguide.

6. The apparatus of claim 1, wherein the housing further includes an additional resonant cavity formed adjacent to an inside of the horn.

7. The apparatus of claim 1, wherein an output of the microphone sensor is modified by a notch filter.

8. The apparatus of claim 7, wherein the notch filter has a limited maximum attenuation in addition to a specified notch frequency and quality factor.

9. The apparatus of claim 7, wherein only one op-amp is used in the notch filter.

10. The apparatus of claim 7, wherein the notch filter has feedback current return path that shares current with the return path of one or more frequency limiters in the filter and the ratio of currents is less than 10:1.

* * * * *